Inventor
William S. Wolfram
By Blackmore, Spencer & Flint
Attorneys

Patented Feb. 7, 1939

2,146,042

UNITED STATES PATENT OFFICE 2,146,042

AUTOMOBILE CLUTCH

William S. Wolfram, Dayton, Ohio, assignor to General Motors Corporation, Detroit, Mich., a corporation of Delaware Application July 8, 1937, Serial No. 152,473

4 Claims. (Cl. 192—52)

This invention relates to friction clutches and in particular to such a clutch as is used between the engine of a motor vehicle and the input shaft of the change speed transmission.

An object of the invention is to provide for a gradual application of the load when the engaging elements of the clutch come into frictional contact.

A more specific object is to provide an improved driven member adapted for use in an otherwise conventional clutch.

Still further, the clutch makes use of a resilient means opposing the action of the main clutch spring, this resilient means operable to cause a gradual clutch engagement and the construction so locates the resilient means that it shall be subjected as little as possible to the heat developed by the friction incident to the engagement of the clutch members.

Other objects and advantages will be understood from the following description.

Figure 1:
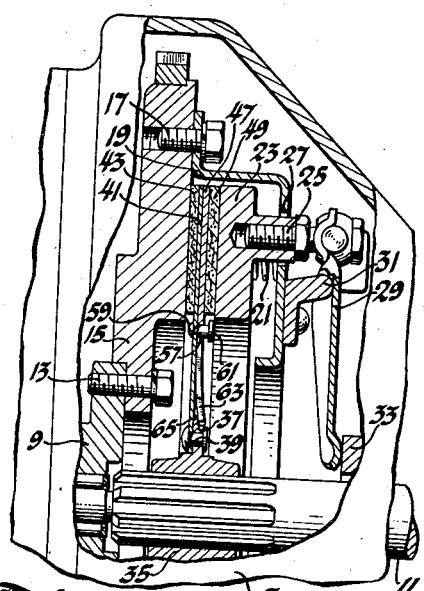
Figure 1 is a transverse section through the improved clutch.
Figure 2:
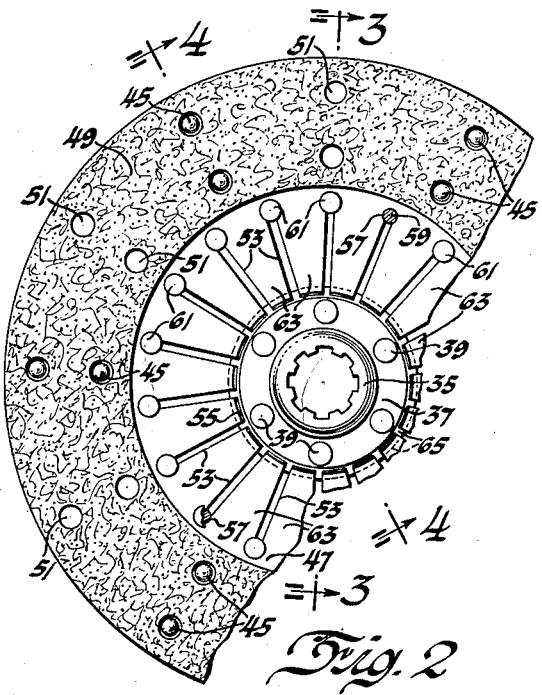
Figure 2 shows the driven member in elevation.

Numerals of reference are used on the drawing as follows:

Numeral 7 shows the housing for the clutch by which the engine crankshaft 9 drives the input shaft 11 leading to the change speed transmission not shown.

Numeral 13 is one of the fastening means for securing the flywheel 15 to the crankshaft. Fastening means 17 serve to secure to the flywheel a cover 19, this cover acting as an abutment for springs 21 operable to push a pressure plate 23 toward the flywheel and grip the driven member therebetween.

A more or less conventional releasing means is illustrated. The pressure plate has a plurality of projecting lugs extending through openings 27 of the cover plate. Threaded into these lugs are members 25, the rounded ends of which are adapted to be engaged by similarly shaped ends of levers or fingers 29, the latter fulcrumed on lugs 31 secured to the cover 19. A sliding collar 33 actuated by any conventional throwout mechanism rotates the fingers 29 for the purpose of moving the pressure plate away from the flywheel against the action of springs 21.

Figure 3:
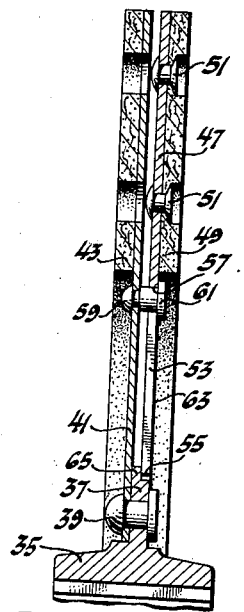
Figure 3 is a section on line 3—3 of Figure 2.
Figure 4:
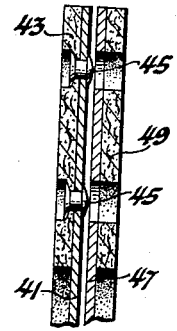
Figure 4 is a section on line 4—4 of Figure 2.

The clutch driven shaft 11 has splined thereon a hub 35 to a radial flange 37 of which is secured by rivets 39 a driven plate 41 of spring steel. The driven plate is provided with a friction clutch facing 43 secured thereto on the side adjacent the flywheel by rivets 45. A second spring steel plate 47 has a facing 49 secured thereto by rivets 51, this facing being on the side of plate 47 adjacent the pressure plate. This second plate has a plurality of radial slots 53 extending from its inner peripheral margin 55 to circular holes 57 located radially within the region of the facing. Shouldered rivets 59 are secured to the driven plate 41 and extend freely through the holes 57 and have heads 61 whereby the plate 47 may move to and fro axially relative to the driven plate but is held from separation therefrom by the heads 61. The slots 53 form spring arms marked on the drawing by numeral 63. The inner ends of these arms engage a radially extended part 65 of the flange 37. The plates 41 and 47 are spaced apart as shown in Figures 3 and 4 when the clutch has been released by the action of the fingers or levers 29. In this relation of parts the plate 47 is held by the rivet heads 61 and its inner spring arms engage the part 65 on the hub. These spring arms are then substantially flat and parallel with the driven plate. When the clutch pedal is released and springs 21 allowed to operate, the pressure plate moves toward the flywheel and pushes plate 47 against plate 41. In so doing the part of plate 47 embracing the rivets 59 moves away from the heads 61 as will be seen by comparing Figure 3 with Figure 1. Also the spring fingers 63 are distorted to the shape shown in Figure 1 owing to their engagement with part 65 on the hub. This bowing of the spring fingers offers sufficient resilient resistance to the action of springs 21 to insure a gradual engagement of the clutch members. It also constitutes a resilient potential energy to effect the separation of member 47 from 41 when the clutch is released. The location of these resilient fingers radially within the region of frictional engagement removes them from the influence of the heat generated by the frictional contact of the clutch members.

I claim:

1. In a friction clutch, spaced driving members having relative axial movement and a driven member adapted to be gripped therebetween, said driven member comprising a hub, a driven plate secured thereto, a second plate, means carried by the driven plate whereby said second plate rotates with the driven plate and has limited axial movement relative thereto, said second plate having a central opening disconnectedly surrounding a first part of said hub, said hub having a second part axially spaced from the first part and extending radially from said hub, said second plate adapted to engage said second part and be flexed thereby when the two plates are gripped between said driving members.

2. The invention defined by claim 1, said first named means comprising shouldered and headed rivets secured to said driven plate, said second plate slidable on said rivets and engageable with the heads thereof.

3. In a friction clutch, spaced driving members having relative axial movement and a driven member adapted to be gripped therebetween, said driven member comprising a hub, a driven plate secured thereto, a second plate, means carried by the driven plate whereby said second plate rotates with the driven plate and has limited axial movement relative thereto, other means on said hub adapted to engage said second plate and cause it to be flexed when the two plates are gripped between said driving members, said second plate formed with spring arms extending radially from said hub.

4. In a friction clutch, spaced annular driving members having relative axial movement, a driven member adapted to be gripped between said driving members, said driven member comprising a central hub, a driven plate secured thereto and extending between said driving members, a second plate parallel to said driven plate and also extending between said driving members, a circular series of headed and shouldered rivets on said driven plate, said second plate slidable axially on said rivets and adapted to engage the heads thereof, said second plate having spring arms extending radially from said shouldered rivets and engaging a part of said hub whereby the spring arms facilitate a gradual clutch engagement, serve to separate said second plate from said driven plate when the clutch is released and by their location are removed from the region of heat generated by the friction of clutch engagement.

WILLIAM S. WOLFRAM.